US012770015B2

(12) United States Patent
Roy Choudhury et al.

(10) Patent No.: US 12,770,015 B2
(45) Date of Patent: Oct. 20, 2026

(54) METHODS AND SYSTEMS FOR AUTONOMOUS TASK COMPOSITION OF VISION PIPELINES USING AN ALGORITHM SELECTION FRAMEWORK

(71) Applicant: Tata Consultancy Services Limited, Mumbai (IN)

(72) Inventors: Abhishek Roy Choudhury, Kolkata (IN); Vighnesh Vatsal, Bangalore (IN); Mahesh Rangarajan, Bangalore (IN); Naveen Kumar Basa Anitha, Bangalore (IN); Aditya Kapoor, Bangalore (IN); Jayavardhana Rama Gubbi Lakshminarasimha, Bangalore (IN); Aravindhan Saravanan, Chennai (IN); Vartika Sengar, Bangalore (IN); Balamuralidhar Purushothaman, Bangalore (IN); Arpan Pal, Kolkata (IN); Nijil George, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 772 days.

(21) Appl. No.: 18/199,708

(22) Filed: May 19, 2023

(65) Prior Publication Data

US 2023/0376781 A1 Nov. 23, 2023

(30) Foreign Application Priority Data

May 20, 2022 (IN) ............................. 202221029279

(51) Int. Cl.
*G06N 3/092* (2023.01)
*G06V 10/82* (2022.01)
(Continued)

(52) U.S. Cl.
CPC ............ *G06N 3/092* (2023.01); *G06V 10/82* (2022.01); *G06V 10/96* (2022.01); *G06T 1/20* (2013.01)

(58) Field of Classification Search
CPC ........ G06V 10/82; G06V 10/96; G06N 3/092; G06T 1/20
See application file for complete search history.

(56) References Cited

U.S. PATENT DOCUMENTS

2020/0387809 A1 12/2020 Banerjee

FOREIGN PATENT DOCUMENTS

IN 202121025523 6/2021

OTHER PUBLICATIONS

Sengar, et al. (Automatic Synthesis of Computer Vision Workflow using AI Planning). (Year: 2021).*

(Continued)

*Primary Examiner* — Daniel G Mariam
(74) *Attorney, Agent, or Firm* — Finnegan, Henderson, Farabow, Garrett & Dunner, LLP

(57) ABSTRACT

This disclosure relates generally to systems and methods for autonomous task composition of vision pipelines using an algorithm selection framework. The framework leverages transformer architecture along with deep reinforcement learning techniques to search an algorithmic space for unseen solution templates. In an embodiment, the present disclosure describes a two stage process of identifying the vision pipeline for a particular task. At first stage, a high-level sequence of the vision pipeline is provided by a symbolic planner to create the vision workflow. At second stage, suitable algorithms for each high-level task are selected. This is achieved by performing a graph search using a transformer architecture over an algorithmic space on each component of generated workflow. In order to make (Continued)

the system more robust, weights of embedding, key and query networks of a visual transformer are updated with a Deep Reinforcement Learning framework that uses Proximal Policy Optimization (PPO) as underlying algorithm.

12 Claims, 9 Drawing Sheets

(51) Int. Cl.
*G06V 10/96* (2022.01)
*G06T 1/20* (2006.01)

(56) References Cited

OTHER PUBLICATIONS

Lyu et al., "SDRL: Interpretable and Data-Efficient Deep Reinforcement Learning Leveraging Symbolic Planning," (2019).

* cited by examiner

200

METHODS AND SYSTEMS FOR AUTONOMOUS TASK COMPOSITION OF VISION PIPELINES USING AN ALGORITHM SELECTION FRAMEWORK

PRIORITY CLAIM

This U.S. patent application claims priority under 35 U.S.C. § 119 to: India Application No. 202221029279, filed on May 20, 2022. The entire contents of the aforementioned application are incorporated herein by reference.

TECHNICAL FIELD

The disclosure herein generally relates to the field of computer vision, and, more particularly, to methods and systems for autonomous task composition of vision pipelines using an algorithm selection framework.

BACKGROUND

With evolution in field of computer vision, many applications where sensory data and artificial intelligence/machine learning (AI/ML) techniques are involved, solving a computer vision task effectively and efficiently is necessary. One important part of solving the vision task is to create a vision pipeline in which correct sequence of preprocessing steps and algorithms, that are most suitable for executing the vision task, are required to be identified. Creating a vision pipeline for different datasets to solve a computer vision task is a complex and time-consuming process. Conventionally, the vision pipelines have been developed based on human intelligence by relying on their experience, trial and error or using template-based approaches. However, human expert-based design is slow and requires more effort since search space for choosing suitable algorithms for achieving a particular vision task is large. Further, in few conventional systems, data available to construct a vision workflow belongs to a fixed distribution but building systems with such a constraint may lead to failures when these systems are deployed in real-world due to various uncertainties. Further, core components at system level to enable the vision workflow composition is missing in the conventional systems.

SUMMARY

Embodiments of the present disclosure present technological improvements as solutions to one or more of the above-mentioned technical problems recognized by the inventors in conventional systems. For example, in one embodiment, a processor implemented method for autonomous task composition of vision pipelines using an algorithm selection framework is provided. The method comprising receiving, via one or more hardware processors, (i) a plurality of input data pertaining to one or more domains of one or more enterprises and (ii) a descriptive query from a user as input, wherein the plurality of input data comprises one or more input parameters, one or more domain requirements and corresponding solutions, and wherein the descriptive query describes a goal task to be executed on the plurality of input data; identifying, via the one or more hardware processors, a vision pipeline for execution of the goal task by inputting the descriptive query and one or more state attribute levels corresponding to the plurality of input data to a symbolic planner, wherein the symbolic planner dynamically composes one or more subtasks associated with the goal task and constructs a Directed Acyclic Graph (DAG) for each of the one or more subtasks using a parser; identifying, via the one or more hardware processors, a set of algorithms from a plurality of algorithms that are suitable to be executed at one or more stages of the vision pipeline for execution of the goal task using a transformers and Reinforcement Learning (RL) based autonomous pipeline composition framework, wherein the transformers and Reinforcement Learning based autonomous pipeline composition framework comprises a set of RL policies that are interlinked and resemble every step in the vision pipeline, and wherein each RL policy comprises: (i) a task specific module comprising the plurality of algorithms that performs a specific sub task from the one or more subtasks associated with the goal task; (ii) an embedding module comprising one or more neural networks corresponding to each algorithm in the plurality of algorithms comprised in the task specific module, wherein each fully connected neural network of the embedded module is configured to map output of each algorithm in the subset of algorithms to a specific embedding output dimensionality; and (iii) a transformer module comprising a key network and a query network, wherein the key network converts an embedding output of each of the set of algorithms into a key vector and the query network receives an aggregation output of the embedding output of each of the subset of algorithms to generate a global query vector; and dynamically configuring, via the one or more hardware processors, the vision pipeline for execution of one or more goal tasks in one or more environment and system configurations.

In another aspect, a system for autonomous task composition of vision pipelines using an algorithm selection framework is provided. The system comprising a memory storing instructions, one or more communication interfaces, and one or more hardware processors coupled to the memory via the one or more communication interfaces, wherein the one or more hardware processors are configured by the instructions to: receive, (i) a plurality of input data pertaining to one or more domains of one or more enterprises and (ii) a descriptive query from a user as input, wherein the plurality of input data comprises one or more input parameters, one or more domain requirements and corresponding solutions, and wherein the descriptive query describes a goal task to be executed on the plurality of input data; identify, a vision pipeline for execution of the goal task by inputting the descriptive query and one or more state attribute levels corresponding to the plurality of input data to a symbolic planner, wherein the symbolic planner dynamically composes one or more subtasks associated with the goal task and constructs a Directed Acyclic Graph (DAG) for each of the one or more subtasks using a parser; identify, a set of algorithms from a plurality of algorithms that are suitable to be executed at one or more stages of the vision pipeline for execution of the goal task using a transformers and Reinforcement Learning (RL) based autonomous pipeline composition framework, wherein the transformers and Reinforcement Learning based autonomous pipeline composition framework comprises a set of RL policies that are interlinked and resemble every step in the vision pipeline, and wherein each RL policy comprises: (i) a task specific module comprising the plurality of algorithms that performs a specific sub task from the one or more subtasks associated with the goal task; (ii) an embedding module comprising one or more neural networks corresponding to each algorithm in the plurality of algorithms comprised in the task specific module, wherein each fully connected neural network of the embedded module is configured to map output of each algorithm in the subset of algorithms to specific embedding output dimensionality; and (iii) a transformer module comprising a key network and a query network, wherein the key network converts an embedding output of each of the set of algorithms into a key vector and the query network receives an aggregated output of the embedding output of each of the subset of algorithms to generate a global query vector; and dynamically configure, the vision pipeline for execution of one or more goal tasks in one or more environment and system configurations.

In yet another aspect, a non-transitory computer readable medium for autonomous task composition of vision pipelines using an algorithm selection framework is provided. The non-transitory computer readable medium comprising receiving, (i) a plurality of input data pertaining to one or more domains of one or more enterprises and (ii) a descriptive query from a user as input, wherein the plurality of input data comprises one or more input parameters, one or more domain requirements and corresponding solutions, and wherein the descriptive query describes a goal task to be executed on the plurality of input data; identifying, a vision pipeline for execution of the goal task by inputting the descriptive query and one or more state attribute levels corresponding to the plurality of input data to a symbolic planner, wherein the symbolic planner dynamically composes one or more subtasks associated with the goal task and constructs a Directed Acyclic Graph (DAG) for each of the one or more subtasks using a parser; identifying, a set of algorithms from a plurality of algorithms that are suitable to be executed at one or more stages of the vision pipeline for execution of the goal task using a transformers and Reinforcement Learning (RL) based autonomous pipeline composition framework, wherein the transformers and Reinforcement Learning based autonomous pipeline composition framework comprises a set of RL policies that are interlinked and resemble every step in the vision pipeline, and wherein each RL policy comprises: (i) a task specific module comprising the plurality of algorithms that performs a specific sub task from the one or more subtasks associated with the goal task; (ii) an embedding module comprising one or more neural networks corresponding to each algorithm in the plurality of algorithms comprised in the task specific module, wherein each fully connected neural network of the embedded module is configured to map output of each algorithm in the subset of algorithms to a specific embedding output dimensionality; and (iii) a transformer module comprising a key network and a query network, wherein the key network converts an embedding output of each of the set of algorithms into a key vector and the query network receives an aggregation output of the embedding output of each of the subset of algorithms to generate a global query vector; and dynamically configuring, the vision pipeline for execution of one or more goal tasks in one or more environment and system configurations.

In accordance with an embodiment of the present disclosure, the transformer module comprised in each RL policy computes a dot product of each key vector corresponding to each algorithm in the plurality of algorithms comprised in the task specific module and the global query vector to obtain a weighted score.

In accordance with an embodiment of the present disclosure, the weighted score is used to identify an algorithm from the subset of algorithms to perform the specific subtask from the one or more subtasks associated with the goal task.

In accordance with an embodiment of the present disclosure, the symbolic planner dynamically composes the one or more subtasks associated with the goal task based on one or more user specified functionalities and corresponding metadata.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
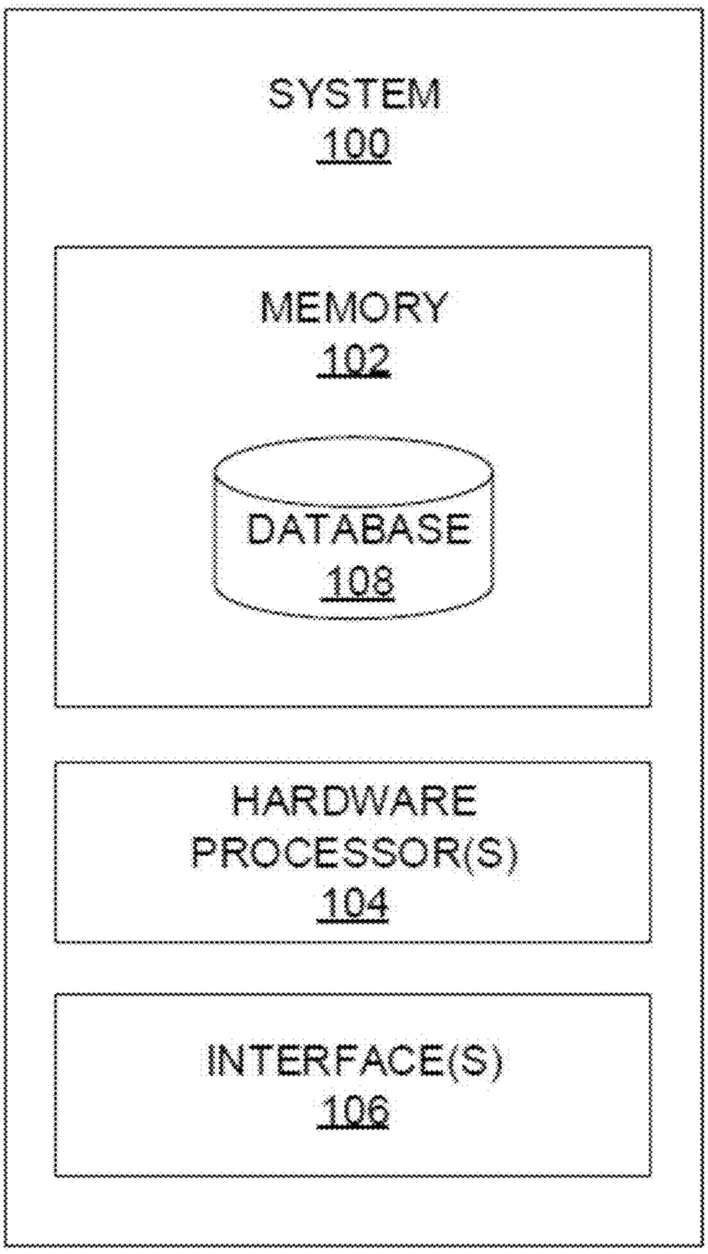
FIG. 1 illustrates an exemplary system for autonomous task composition of vision pipelines using an algorithm selection framework according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Vision pipeline creation for different datasets to solve a computer vision task is a complex and time-consuming process. One of the most important parts of solving a computer vision task is to correctly identify correct sequence of preprocessing steps and algorithms that are most suitable for restoring input data to a format that can be used for achieving a goal task. Preprocessing of data such as images and videos plays a very vital role in performance of the vision pipeline. Inappropriate choices of the sequence of preprocessing steps and algorithms can drastically hamper the performance of the goal task. Vision pipeline can have different workflows and algorithms to choose from are fairly large in number. For a given task, there can exist multiple such sequence of algorithmic configurations to choose from. Also, for same task there can be multiple different workflows for different system and environment conditions. For example, an image corrupted by changing exposure and then adding noise can be retrieved by both doing exposure correction followed by denoising and by denoising followed by exposure correction. With such a diverse set of choices, the time, effort, and resources needed to build the vision pipeline increases exponentially. In many cases, data available to construct a vision pipeline belongs to a fixed distribution and hence building systems with such a constraint leads to failures when these systems are deployed in real world due to various uncertainties. In cases where there is a need to optimize memory, energy and time of entire vision pipeline, right choice of algorithms at different stages of the vision workflow becomes increasingly more difficult and complex. Along with these difficulties and due to fast moving nature of the field of computer vision, pool of algorithms to choose from keeps expanding. On the contrary, comparison of all algorithms based on intuition too, can yield suboptimal solutions. Conventionally, the vision pipelines are developed based on human intelligence by relying on their experience, trial and error or using template-based approaches. Human expert-based design is slow, especially in cases when the image has undergone multiple forms of distortions. Thus, there is a need to automate processes of design choices to achieve good results rapidly.

As the present disclosure embark on creating an automated system, there exists a gap in existing engineering framework to achieve a required goal. For example, a classification engineering platform is created to aid an expert in stitching an end-to-end computer vision solution. Further, key elements including meta-data and domain knowledge required by a server to stitch an end-to-end pipeline is absent in the existing solutions.

Embodiments of the present disclosure provide systems and methods for autonomous task composition of vision pipelines using an algorithm selection framework. The framework leverages transformer architecture along with deep reinforcement learning techniques to search an algorithmic space for unseen solution templates. In an embodiment, the present disclosure describes a two stage process of identifying the vision pipeline for a particular task. At first stage, a high-level vision pipeline comprising of a plurality of tasks such as denoising, exposure correction, classification, object detection, and/or the like and forming a sequence are put together to create the vision workflow. This is considered as a sequence to sequence (seq2seq) decision making problem. At second stage, suitable algorithms for each high-level task are selected. Here, the high-level tasks may include but are not limited to Denoising using fully functional deep neural network (FFDNet), exposure correction including gamma correction 0.5, classification using residual network (Resnet-50), and/or the like. This is achieved by making algorithmic choices based on representation power of the algorithms and improve selection process over a training period with help of Deep Reinforcement Learning. In present disclosure, a high-level sequence of the vision pipeline is provided by a symbolic planner. Further, a graph search using a transformer architecture over an algorithmic space is performed on each component of generated workflow. In order to make the overall system more robust, weights of embedding, key and query networks of a visual transformer are updated with a Deep Reinforcement Learning framework that uses Proximal Policy Optimization (PPO) as the underlying algorithm.

In other words, after the sequence of steps are decided, a knowledge based graph search is performed over the algorithmic space at every stage of the vision pipeline and identifies the algorithms and the corresponding parameters that would be well suited to complete the vision pipeline for a given input. As the method of the present disclosure retrieve algorithms dynamically, it reduces level of human intervention for algorithm selection. Further, the system of the present disclosure exhibits an ability to adapt to unforeseen algorithms that can be introduced at any point in the search space, hence requiring little to no retraining of the framework.

Referring now to the drawings, and more particularly to FIGS. 1 through 7C, where similar reference characters denote corresponding features consistently throughout the figures, there are shown preferred embodiments and these embodiments are described in the context of the following exemplary system and/or method.

FIG. 1 illustrates an exemplary system 100 for autonomous task composition of vision pipelines using an algorithm selection framework according to some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W 5 and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises a plurality of tasks, goal task, one or more subtasks, vision pipeline, knowledge base, domain expert knowledge, one or more domain files, training problem files and corresponding solutions, a plurality of algorithms. The database 108 further stores directed acyclic graphs for each of the one or more subtasks.

The database 108 further stores a set of RL policies, one or more architectures, one or more modules such as task specific module, embedding module, transformer module, one or more engines such as data management engine, data acquisition engine, data processing engine, inference and reasoning engine, and advisory generation engine.

The database 108 further comprises one or more networks such as one or more artificial intelligence networks, one or more neural network(s) which when invoked and executed perform corresponding steps/actions as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
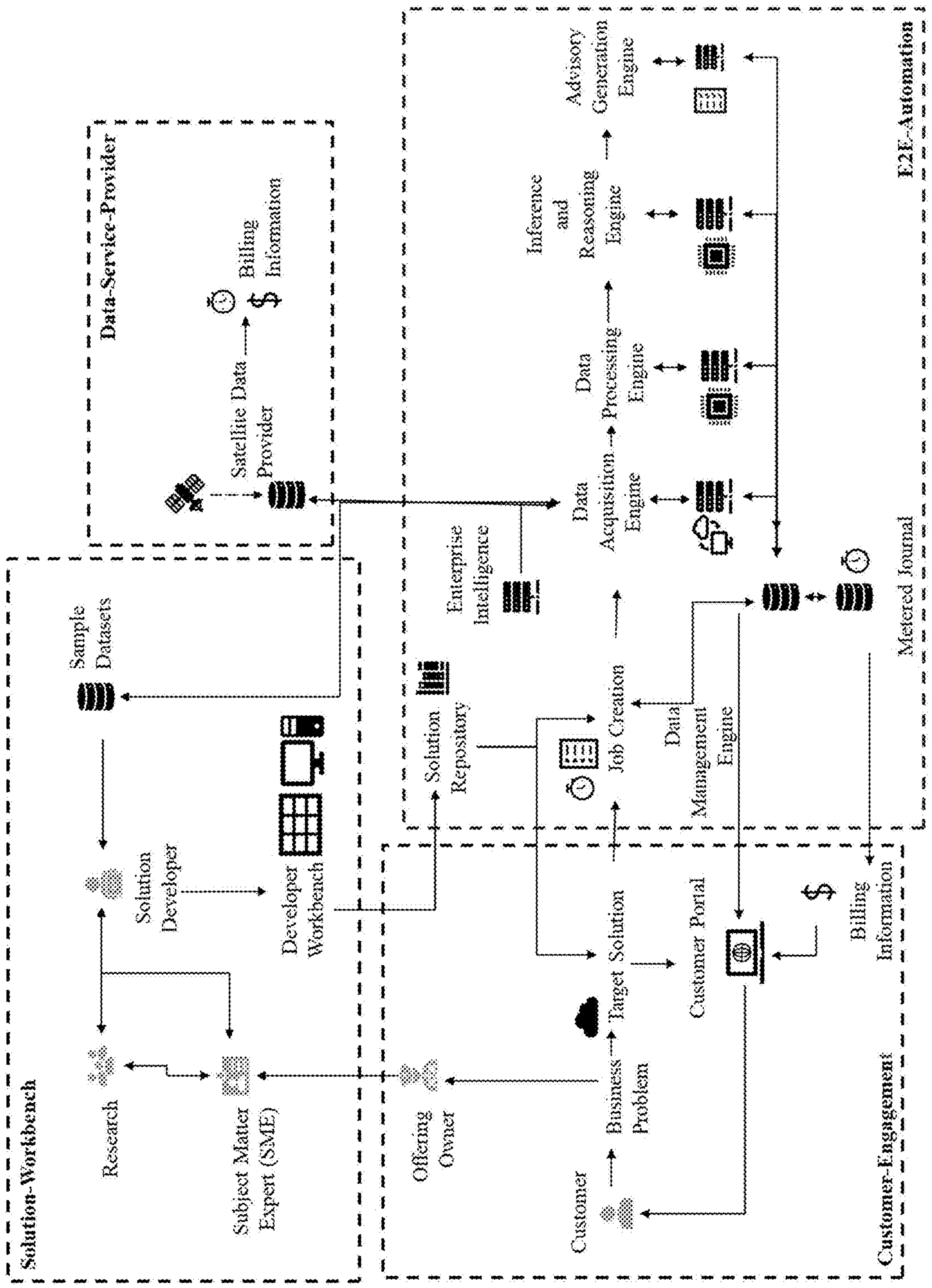
FIG. 2 illustrate a functional block diagram of a vision specific unstructured artificial intelligence (AI) platform for autonomous task composition of vision pipelines using an algorithm selection framework according to some embodiments of the present disclosure.

FIG. 2, with reference to FIG. 1, illustrate a functional block diagram of a vision specific unstructured artificial intelligence (AI) platform for autonomous task composition of vision pipelines using an algorithm selection framework according to some embodiments of the present disclosure.

Figure 3:
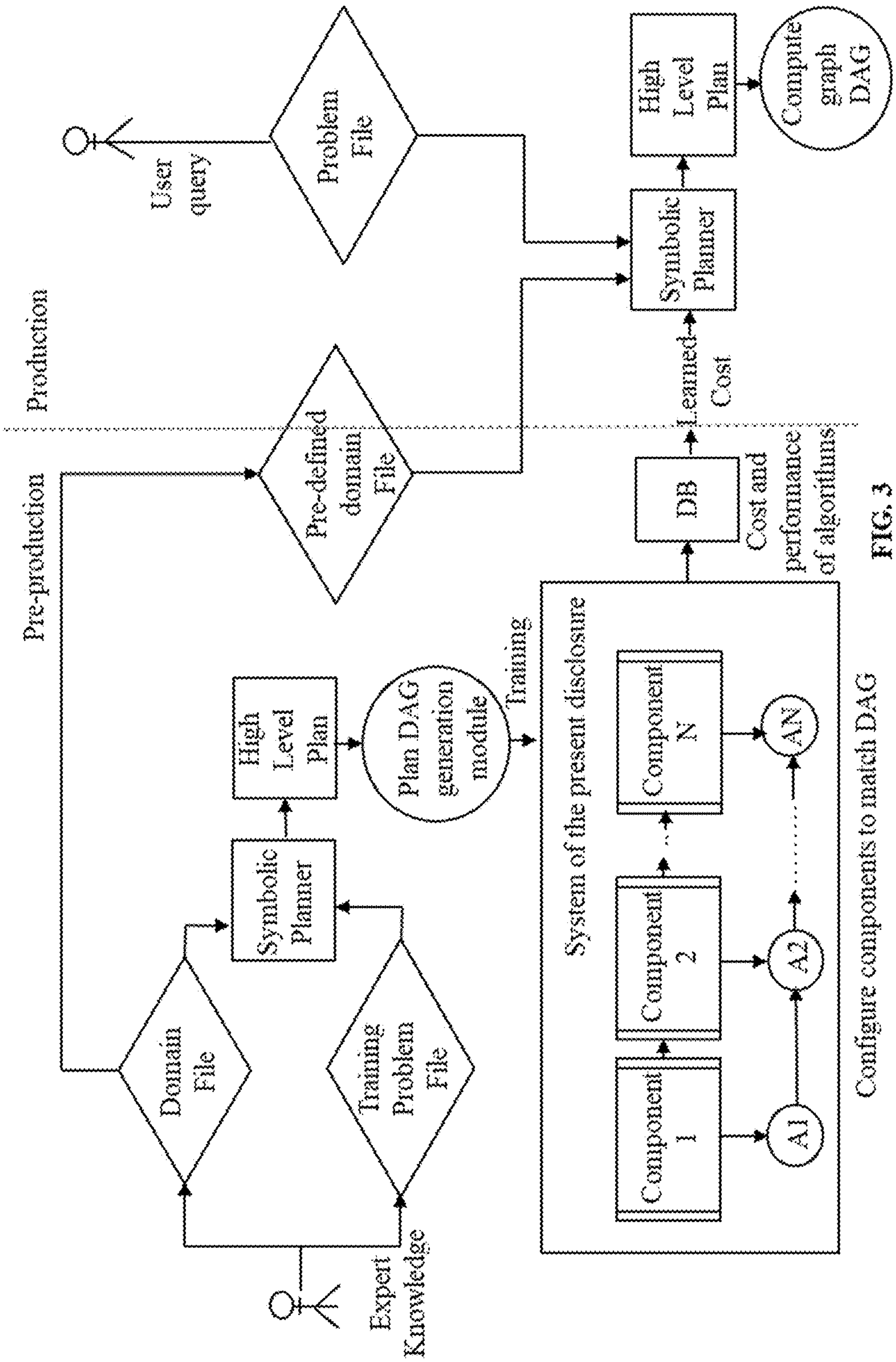
FIG. 3 illustrates a functional block diagram for autonomous task composition of vision pipelines using an algorithm selection framework according to some embodiments of the present disclosure.

FIG. 3, with reference to FIGS. 1-2, illustrates a functional block diagram for autonomous task composition of vision pipelines using an algorithm selection framework according to some embodiments of the present disclosure.

Figure 4:
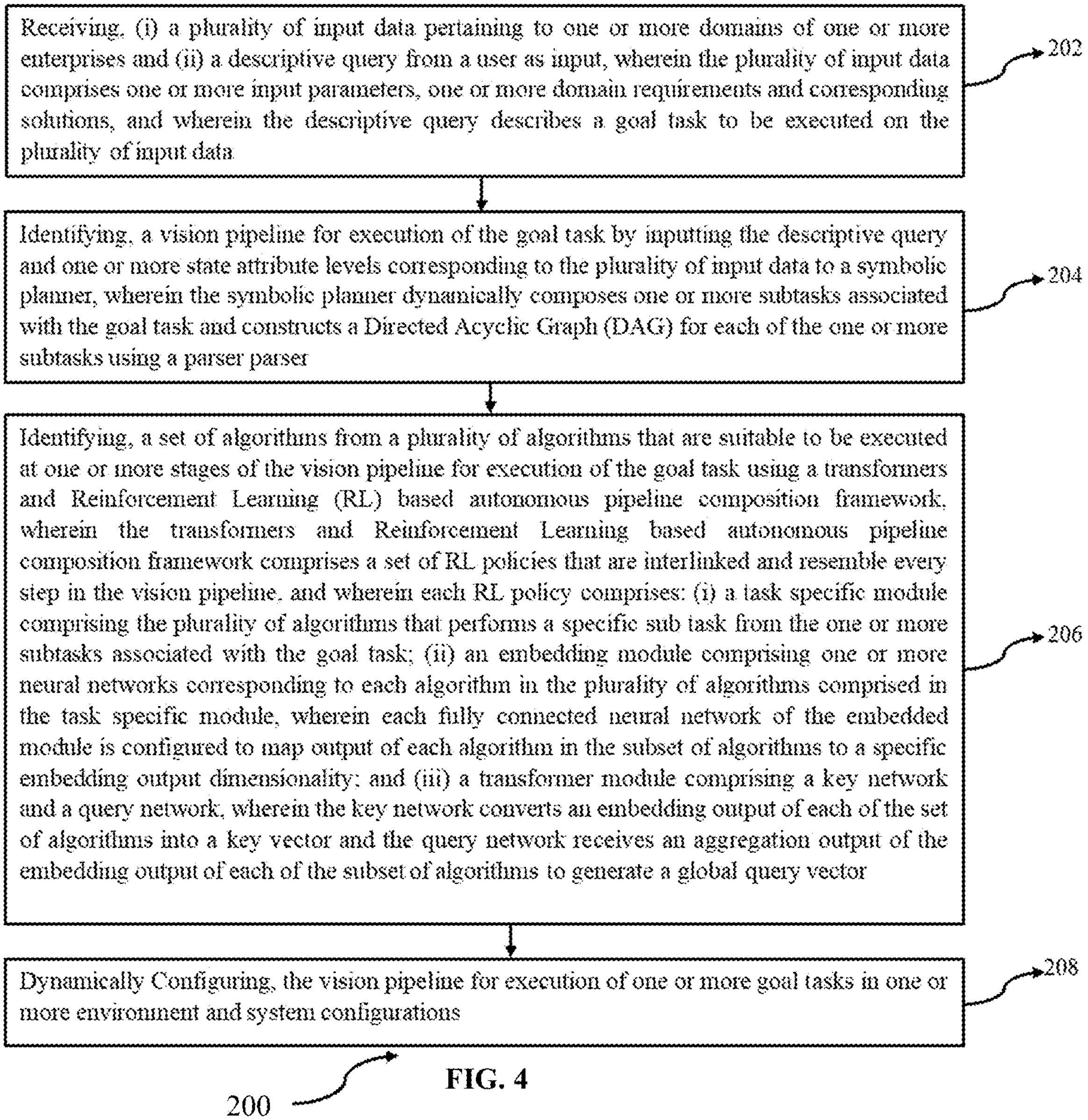
FIG. 4 illustrates an exemplary flow diagram illustrating a method for autonomous task composition of vision pipelines using an algorithm selection framework in accordance with some embodiments of the present disclosure.

FIG. 4, with reference to FIGS. 1-3, depicts an exemplary flow diagram illustrating a method 200 for autonomous task composition of vision pipelines using an algorithm selection framework, using the system 100 of FIG. 1, in accordance with an embodiment of the present disclosure.

Referring to FIG. 4, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the block diagram of FIG. 2, the block diagram of FIG. 3, the flow diagram as depicted in FIG. 4, the architectural diagram of FIG. 5 and the block diagram of FIG. 6. At step 202 of the present disclosure, the one or more hardware processors 104 receive, via a first block (e.g., refer customer engagement block of the block diagram) and a second block (e.g., refer end to end automation block of the block diagram) of the visual specific unstructured AI platform, a plurality of input data pertaining to one or more domains of one or more enterprises and (ii) a descriptive query from a user as input. In an embodiment, the visual specific unstructured AI platform is considered to be a set of micro-services that run on cloud or on-premise. The plurality of input data may include but are not limited to images, time series, audio, video, and/or the like. However, in the present disclosure, images are considered for the simplifying the explanation. In an embodiment, the plurality of input data comprises one or more input parameters, one or more domain requirements and corresponding solutions. In an embodiment, the one or more domain requirements may include problem statements related to one or more domains. Here, the one or more domains could be but not limited to analytics, retail, healthcare, and/or the like. In an embodiment, the one or more input parameters may include but not limited to scheduling, date range, Area of Interest (AOI) and solution selection in satellite analytics domain. In an embodiment, the descriptive query describes a goal task to be executed on the plurality of input data. As depicted in the block diagram of FIG. 2, the first block (e.g., refer customer engagement block of the block diagram) is an user interface (UI) for customers to interact with the system of present discourse which receives the one or more domain requirements from customer in terms of business problem and corresponding solutions for the one or more domain requirements and a corresponding solution (also referred as business/domain output) in form of meta data or visualizations for a specific requirement from the one or more domain requirements given by the customer is received from the second block (e.g., refer end to end automation block of the block diagram) of the visual specific unstructured AI platform. The descriptive query describes a goal task to be executed on the plurality of input data. In an embodiment, the corresponding solution could be an analyzed report or advisory generated. The one or more domain requirements can have different features based on use case. For example, in case of satellite analytics, the customer engagement block helps in getting inputs in terms of scheduling, date range, Area of Interest (AOI) and solution selection. If required, a satellite data provider selection can also be performed. This block also helps in visualization of analysis output and integrate with an enterprise geographic information system GIS system. The UI also has admin functionality to facilitate tenant and user management, Role-based access control (RBAC), multi-tenancy, satellite data provider on-boarding, resource management, system monitoring, billing and help in debugging.

At step 204 of FIG. 4, the one or more hardware processors 104 identify, via the second block (e.g., refer end to end automation block of the block diagram) of the visual specific unstructured AI platform, a vision pipeline for execution of the goal task by inputting the descriptive query and one or more state attribute levels corresponding to the plurality of input data to a symbolic planner. The one or more state level attributes are determined using one or more state attribute identifier (SAI) based artificial neural networks. The one or more state attribute identifier based artificial neural networks are trained to construct a knowledge base that enables the framework as described and implemented by the system and method of the present disclosure to perform a guided search over algorithm set for finding suitable algorithms by searching out appropriate state transitions from initial state to goal state.

In an embodiment, the vision pipeline is considered as sequential decision-making problem that can be modeled as Markov Decision Processes (MDPs). An MDP is defined by $(S, A, P, R, \rho_0, \gamma)$, where S is state space (i.e., image), A is action space (i.e., a set of algorithms), $P(s_{l+1}|s_l, a_l)$ specifies state transition probability distribution (i.e., image obtained after processing by an algorithm), $R(r_l|s_l, a_l)$ specifies a reward distribution (for example: validation accuracy for classification, reconstruction loss for preprocessing steps), $\rho_0(s_0)$ denotes initial state distribution (i.e., distorted image), and $\gamma \in (0, 1]$ denotes a discount factor. At each timestep, the RL policy selects an action independently according to its (corresponding or associated) state-conditioned policy $\pi_i(a_l|s_l; \theta)$, where $s_l$ denotes state information available to the RL policy and $\theta$ denotes its parameters. The RL policy subsequently earns a reward $r_l$ sampled from R, and environment undergoes a state transition, $s_{l+1} \sim P(\cdot|s_l, a_l)$. In the present disclosure, focus is on solving the algorithm selection task, wherein at each timestep the vision pipeline progresses one step further, and the RL policy attempts to maximize the rewards. More precisely, optimal policy parameters are found that solve $\theta^* = \arg\max J(\theta)$, where $J(\theta)$ is determined using equation (1) below as:

$$J(\theta) = E\left[\sum_{l=0}^{L} \gamma^l r_l\right] \quad (1)$$

Here, L denotes length of the vision pipeline. By policy gradient theorem, gradient of J with respect to the policy parameters θ is given by equation (2) below:

$$\nabla_\theta J(\theta)=E[\nabla_\theta \log \pi(a_l|s_l)(Q^\pi(s_l,a_l)-b(s_l,a_l))] \quad (2)$$

Here, $Q^\pi(s_l, a_l)$ denotes expected future reward, and $b(s_l, a_l)$ is commonly known as a baseline function, which can be any function that depends on the state, and the actions at length l. Often a learned value function is used for the baseline but in the present disclosure a running mean of validation accuracy from previous episodes is used as the baseline.

The step 204 is further better understood by way of following exemplary explanation.

In the present disclosure, two different neural networks are trained to identify exposure and noise levels of the input image. The noise levels are bifurcated into four categories; no-noise-level, low noise-level, mid-noise-level and high-noise-level and exposure levels are bifurcated into three categories; under-exposed, correctly-exposed and over-exposed. The state identifiers complement the search algorithm to restrict the search over the set of algorithms that would be suited to address the distortion the input image has undergone. This helps in constructing a knowledge base that enables the method of the present disclosure to perform a guided search over algorithm set. For example, if a state attribute identifier for exposure detected that the input image is underexposed, the search algorithm is restricted to perform its search over algorithms that are eligible for correcting underexposed images. In this way, as domain knowledge is introduced while performing the search, it is ensured that convergence is achieved at a faster rate. The State Attribute Identifier (SAI) neural networks are trained in a supervised way wherein they need to classify the distortion level in the input image. In the present disclosure, a known in the art image dataset CIFAR-10 (refer 'A. Krizhevsky, V. Nair, and G. Hinton, "Cifar-10 (canadian institute for advanced research)." [Online]. Available: http://www.cs.toronto.edu/kriz/cifar.html') is used, the images in the image dataset are distorted and distortion levels are associated with their respective labels. A residual network (Resnet-50) is used as backbone of both the state identifiers. There are other ways to extract the state attribute levels of an image, but they require manual intervention at various points in decision making process.

Figure 5:
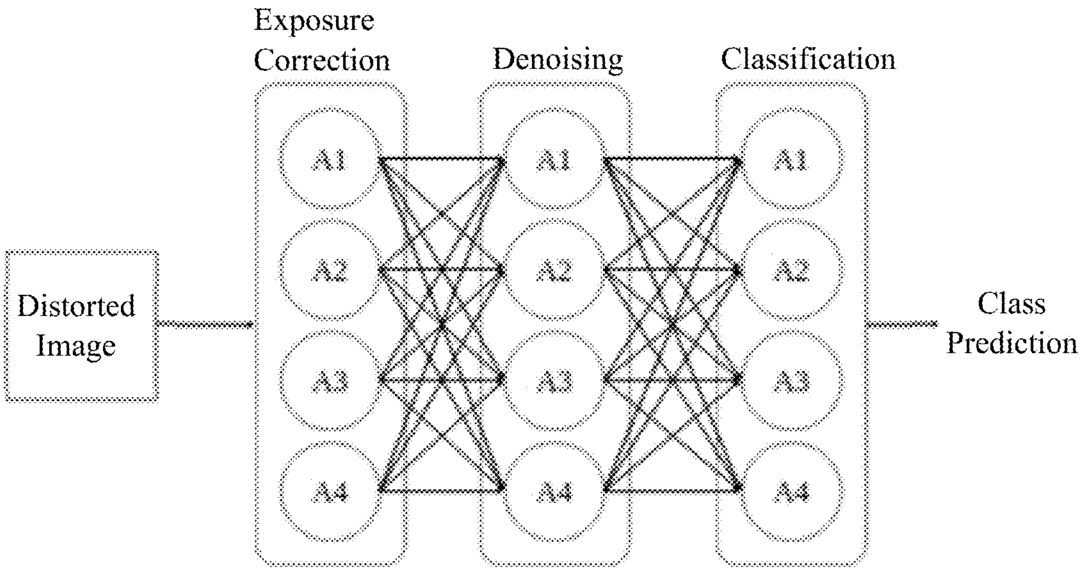
FIG. 5 is an architectural diagram of a transformers and reinforcement Learning (RL) based autonomous pipeline composition framework according to some embodiments of the present disclosure.
Figure 6:
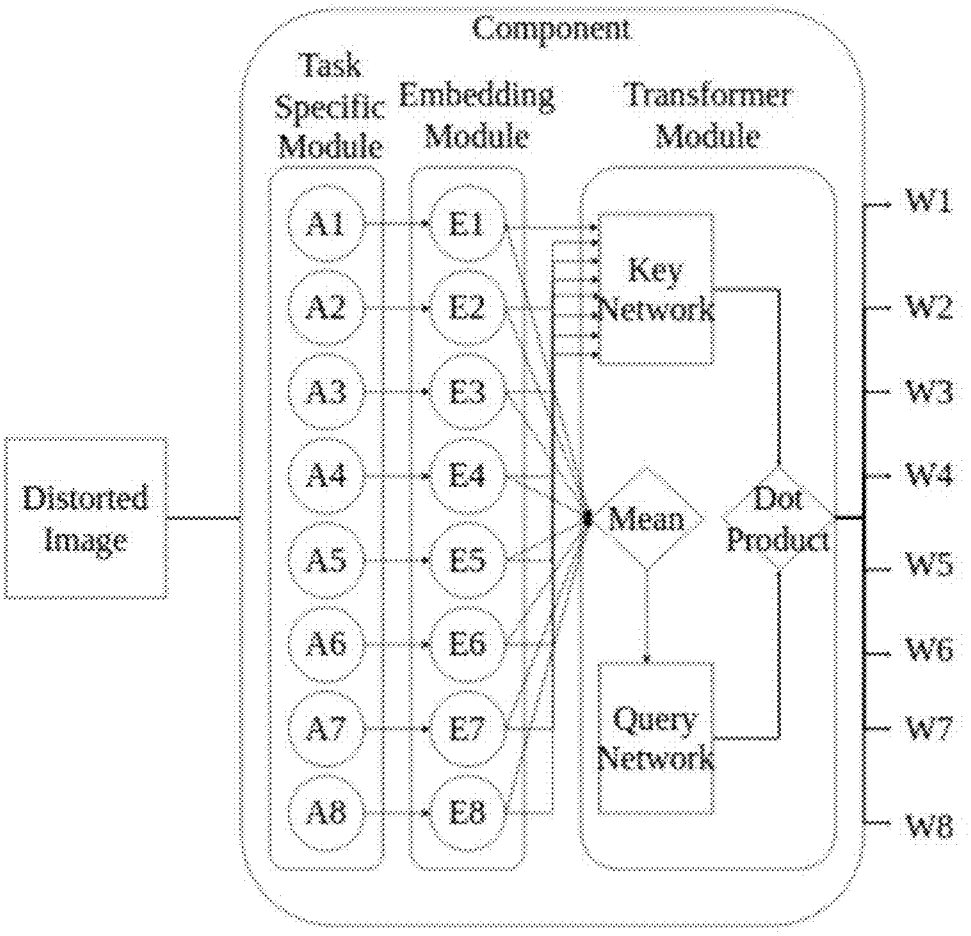
FIG. 6 is a functional block diagram of a reinforcement learning (RL) policy architecture for autonomous task composition of vision pipelines using an algorithm selection framework according to some embodiments of the present disclosure FIGS. 7A through 7C provides a comparison of conventional systems with the system of the present disclosure in terms of classification accuracy for a classification task on different distorted images according to some embodiments of the present disclosure.

In an embodiment, at step 206 of FIG. 4, the one or more hardware processors 104 identify, via the second block (e.g., refer end to end automation block of the block diagram), a set of algorithms from a plurality of algorithms that are suitable to be executed at one or more stages of the vision pipeline for execution of the goal task using a transformers and Reinforcement Learning (RL) based autonomous pipeline composition framework (also referred as Auto-TransRL approach in the description). FIG. 5 is an architectural diagram of a transformers and reinforcement Learning (RL) based autonomous pipeline composition framework according to some embodiments of the present disclosure. As shown in FIG. 5, a meta-neural network is provided, where each individual neuron in a layer of the meta-neural network is a complex function. This means that the meta-neural network itself and knowledge guided search acts as a "thoughtful" dropout layer. Also, every layer in the meta-neural network specializes in a very specific task and can be correlated to convolutional neural network (CNN) layers in a classifier. The Transformers and Reinforcement Learning based autonomous pipeline composition framework comprises a set of RL policies that are interlinked and resemble every step in the vision pipeline. FIG. 6 is a functional block diagram of a reinforcement learning (RL) policy architecture for autonomous task composition of vision pipelines using an algorithm selection framework according to some embodiments of the present disclosure. As shown in FIG. 6, each RL policy comprises: a task specific module comprising the plurality of algorithms that perform a specific sub task from the one or more subtasks associated with the goal task, an embedding module comprising one or more neural networks corresponding to each algorithm in the plurality of algorithms comprised in the task specific module. The one or more neural networks may include but are not limited to convolutional networks, fully connected networks, and/or the like. Here, each of the one or more neural networks of the embedding module is configured to map the output of each algorithm in the subset of algorithms to a specific embedding output dimensionality. In an embodiment, the specific embedding output dimensionality refers to a common embedding output dimensionality. In other words, the output of each algorithm in the subset of algorithms is mapped to same embedding output dimensionality by each of the one or more neural networks of the embedding module. The RL policy further comprises a transformer module comprising a key network and a query network. The key network converts an embedding output of each of the set of algorithms into a key vector corresponding to each algorithm in the task specific module and the query network receives an aggregated output of the embedding output of each of the subset of algorithms to generate a global query vector. The aggregated output of the embedding output may include mean, concatenation, sum or output of any other aggregation operation performed on the embedding output by the one or more neural networks. In an embodiment, the transformer module comprised in each RL policy computes a dot product of each key vector corresponding to each algorithm in the plurality of algorithms comprised in the task specific module and the global query vector to obtain a weighted score. In an embodiment, the weighted score is used to identify an algorithm from the subset of algorithms to perform the specific subtask from the one or more subtasks associated with the goal task.

The step 206 is better understood by way of following exemplary explanation.

The Transformers and Reinforcement Learning (RL) based autonomous pipeline composition framework (i.e., Auto-TransRL approach) in the present disclosure connects a sequence of RL policies according to high-level preprocessing sequence. Every RL policy comprises three modules namely Task Specific Module (TSM), Embedding Module (EM) and Transformer Module (TM). Every RL policy's TSM comprises a set of algorithms that serve a very specific purpose such as edge detection, classification, exposure correction, and/or the like. Each TSM is followed by the EM. Each algorithm in the TSM is associated with an embedding network in the EM. The EM ensures that output of all algorithms is mapped to same output dimension. The EM is further followed by a TM. The TM consists of a key network K and q query network Q. The embedding networks in EM and the Key and Query Networks in the Transformer Module could be non-linear Multi-Layer Perceptron (MLPs) other forms of neural networks such as Convolutional Neural Networks, Graph Neural Networks, Recurrent Neural Networks and/or the like. The Query network takes as input a mean of all the algorithm (in the TSM) embedding to generate a global query vector which after dot product with the key vectors outputs a relative weight parameter corresponding to every algorithm in the TSM. In other words, some scores are produced for each algorithm by taking a dot product between the key vectors, corresponding to every algorithm in the Task Specific Module, and the global query vector. These scores are further passed through a softmax layer to generate the relative weight parameters corresponding to each algorithm in TSM. As the relative weight parameters generated by the TM are a measure of a similarity score between the mean of every algorithm's output against each algorithm's output, they act as a good metric to select an algorithm. Hence, higher the value of relative weight parameter, better an algorithm is on average because the values of relative weight parameters are a direct measure of an algorithm's representation power. In an embodiment, individual policies are trained to select an algorithm that achieves a specific task using PPO in the vision pipeline and classification accuracy is used as the reward signal for all the policies. In the present disclosure, three policies for Exposure Correction, Denoising and Classification tasks are trained. The relative weight parameters produced by the TM are used as RL policy output. Within the RL policy, the networks in the Embedding Modules and Transformer Module are learned. All the algorithms in Task Specific Module are pre-trained and are not updated during the training process. As a result, all the algorithms in the TSM convert an input image to a latent embedding that belongs to a fixed and learned distribution. Thus, EM in conjunction with TM learns to choose algorithms solely based on the representation power of every algorithm in the TSM. It is assumed that latent embedding generated by each algorithm captures information about distortions that have been made on input image. This assumption is based on empirical evidence that the performance of algorithms suffers if the image is distorted in any manner. For example, classification accuracy for a particular pretrained model for a distorted image dataset would be less when compared to one with no distortions.

The symbolic planner dynamically composes one or more subtasks associated with the goal task and constructs a Directed Acyclic Graph (DAG) for each of the one or more subtasks using a parser as shown in FIG. 3. The symbolic planner further dynamically composes one or more subtasks associated with the goal task based on one or more user specified functionalities and corresponding metadata. The functionalities may include but are not limited to understanding area of interest, resolution, modalities (alternatively referred as type of data), identifying data provider and performing actions such as pre-processing and other processes. Further, the corresponding meta data of the one or more user specified functionalities may include the data received based on selected data provider, data in modalities required. This is further explained with the help of the second block of FIG. 2. In an embodiment, the second block (e.g., refer end to end automation block of the block diagram) of the visual specific unstructured AI platform comprises a job and orchestration layer, a data management engine, a data acquisition engine, an enterprise intelligence layer, a data processing engine, an inference and reasoning engine, an advisory generation engine, a solution repository layer, and a metered journal layer. Based on AOI how many data chunks (alternatively referred as tiles) to be downloaded is determined by the job and orchestration layer. The job and orchestration layer are further explained with the help of FIG. 3. This layer dynamically composes sub-tasks associated with the goal task using the Symbolic Planner that is able to construct the Directed Acyclic Graph (DAG) without requiring domain experts' intervention for every possible case. For example, for a goal task which is change detection for forest fire, the symbolic planner initializes a problem file with help of goal and initial predicates, where goal is change-detected forestfire and initial predicate is region-allocated AOI. The symbolic planner takes a domain file and problem files as inputs. The domain file contains knowledge of all algorithms. Here, the algorithm is defined with the help of its parameters, pre-conditions, and effects. Internally, the symbolic planner search for the sequence of actions to reach the goal predicate (in this case, "changedetected ForestFire"). This is done by tracing back state transitions needed to achieve a goal state. In this case, forest fire change detection is achieved by calling an action "ChangeDetection ForestFire" where ChangeDetection is name of the action and ForestFire is a parameter. One of the effects of "ChangeDetection x" action is predicate "change-detected x" which is also the goal predicate and one of the pre-conditions for this action is "burn-analysed SUTiles". Now, to achieve these pre-conditions, the symbolic planner selects action "BurnAnalysis SUTiles". The effect predicates of the "BurnAnalysis x" action include "burn-analysed x" predicate and precondition include predicates like "image-allocated SUTiles", "image-allocated EUTiles" etc. Then planner search for actions which results these predicates as effects. This backtracking goes on till the action having pre-condition as "region-allocated AOI" is met. Thus, in this way, the symbolic planner synthesizes a solution by searching out appropriate state transitions from initial state to goal state.

In conjunction with the Symbolic Planner, an Auto-TransRL approach to select the algorithms at every stage of the vison pipeline is used. As shown in FIG. 3, dynamic composition of subtasks happens during production or before production, when a set of algorithms is available to choose from, wherein the choice is made with Auto-TransRL. The execution and monitoring of the DAG are also performed by this layer itself. APIfication and metadata server are also part of this layer. This layer helps in uploading AOI in terms of shape file or geojson, satellite data, from user interface (UI) or application program interface (API) to backend (i.e., end-end automation block of FIG. 2) and also solution onboarding. In the backend, there are multiple datastores. AOI can be either graphically drawn or uploaded to the backend. For example, for the goal task, which is change detection for forest fire, two actions namely Burn-detection and change detection are considered. It is assumed that the set of algorithms selected for Burn-detection are B1, B2, B3, and the like and the set of algorithms selected for change detection are C1, C2, C3, C4, and the like. In this case, based on the weights learned by the system of the present disclosure, it is better to implement B2 followed by C4 to perform change detection for forest fire. Thus, the job and orchestration layer compose the subtasks as following:

a. Understand the Area of Interest (AOI)
b. Understand the resolution & modality required and based on that identify the data provider
c. Based on AOI and resolution required, find out how many tiles are required
d. Get the start date and also the buffer based on the data provider selected
e. Get the start data tiles (say we call S-tiles) in the modality(ies) required
f. Get the end date and also the buffer based on the data provider selected g. Get the end date tiles (say we call E-tiles) in the modality(ies) required
h. Perform cropping, slicing, stitching based on requirement and compute environment on both S-tiles and E-tiles to have S-U-tiles and E-U-tiles
i. Perform other pre-processing like registration, phase corrections or cloud related pre-processing
j. Perform burn analysis on S-U-tiles using B2 algorithm on both S-U-tiles and E-U-tiles
k. Perform change detection end date analysis from start date analysis using C4 algorithm
l. Process the output and have it in the form of sharing with customer as meta data or visualization Referring back to FIG. 2, the data management engine in the second block (e.g., refer end to end automation block of the block diagram) of the visual specific unstructured AI platform performs polyglot data persistence. Data stores involved are key value pair, message queues, pub-sub methodologies, relational database management system (RDBMS)/meta-data store, spatio-temporal database and object store. The data management engine also abstracts the data stores, and manages data organize, indexing and searching capabilities. The data acquisition engine in the second block (e.g., refer end to end automation block of the block diagram) of the visual specific unstructured AI platform helps in connecting to data providers if data is not available in data management engine. The data could be Earth Observation (EO) or Synthetic Aperture Radar (SAR) satellite modalities and registration of images, fusion of satellite modalities. In case there is a need to ingest data from enterprise in the form of images, video, audio, Comma separated values (CSV) files, the data acquisition engine also enables fusion of satellite modalities with other enterprise modalities. The engine can fuse multiple modalities even beyond visual ranges of electromagnetic spectrum. The examples may include but are not limited to Elevation Model, Synthetic Aperture Radar (SAR), Climate/Weather, and/or the like. This engine includes capabilities to analyze and visualize spectral signatures in the data cube for hyperspectral bands. Further, the enterprise intelligence layer integrates with enterprise systems to get image/video/audio/time-series/JSON (JavaScript Object Notation) data or intelligence output to be integrated with intelligence such as satellite intelligence in case of satellite analytics. The data processing engine in the second block provides analytic run time environment if search result for specific analytics model in that Area of Interest is not found in Data store. This engine help in cropping, splinting and stitching spatio-temporal images. This engine also makes multi-spectral satellite images interoperable and not depend on satellite data source. This engine also concurrently processes multiple windows of a tile (e.g., image or frame) at same time to increase efficiency and block sizes can be adjusted to run the system of the present disclosure on memory constrained devices (e.g., edge devices). The inference and reasoning engine in the second block enable real-time inferencing to maximize CPU/GPU use. This will also have model and data drift calculator, which are (or can be) integrated with workbench. Advisory generation engine in the second block is a rule driven model or analytic model which uses existing analyzed results in batch mode to generate enhanced intelligence for the enterprise. In an embodiment, the existing analyzed results may include one or more solutions created by algorithms, one or more solutions that facilitate the advisory generated at one point of time or windowed. For example, if a rule says that a file can be predicted to be down due to its combustible material if the file is there for more than 2 weeks with a specific intensity. So, the analytic model receives solutions analysis reports/metadata for those previous weeks and determine based on the rule if the advisory can be generated. The solution repository layer in the second block comprises collection of remote sensing indices, machine learning or deep learning (ML/DL) models for horizontal capabilities like change detection or PAN sharpening or Land Use/Land Cover (LULC) classification, ML/DL models for domain specific solutions like vegetation management, land deformation predictions, train track monitoring, and/or the like. These models or indices can be used by the data processing engine. The metered journal layer of the second block helps in billing customers if required. Further, third block (e.g., refer data provider block of the block diagram) of FIG. 2 helps in integrating with satellite data sources and ground station as a service in case of satellite analytics.

Referring to steps of FIG. 4 of the present disclosure, at step 208, the one or more hardware processors 104 dynamically configure, via fourth block (e.g., refer solution workbench block of the block diagram) of FIG. 2, the vision pipeline for execution of one or more goal tasks in one or more environment and system configurations. In an embodiment, the fourth block (e.g., refer solution workbench block of the block diagram) of FIG. 2 helps in Machine Learning Operations (MLOps) that is model and data versioning, model compression, auto testing with model specific testing, and hardware specific auto deployment options.

Experimental Results

In the present disclosure, performance of the system of the present disclosure is evaluated on classification, exposure correction and denoising tasks. The present disclosure provides a comparison of average episode reward against different image distortions among the system of the present disclosure, template-based approaches and by directly feeding into a classifier without any preprocessing layers (Vanilla approaches). This is validated in the present disclosure by observing that the system of the present disclosure generalizes well to unseen algorithms when the performance of the system of the present disclosure and the other baselines is compared on partially known and unknown settings. In the partially known experimental configuration, four unseen algorithms are added along with the ones used during train time and in the unknown experimental configuration, only unseen algorithms are used.

Comparison to Template-Based and Vanilla Approaches

To evaluate the effect of the system of the present disclosure on adapting tendency and performance, the method of the present disclosure is compared to the following baseline approaches on a set of vision tasks:

1. Template Based Systems (Template): For a given distorted image, the algorithm is fixed in order to restore it back to its original format.
2. Vanilla System (Vanilla): For a given distorted image, the distorted image is directly passed through a classifier.

In the present disclosure, Vanilla System is considered as the baseline because it represents a naive approach of dealing with actual task without considering any preprocessing layers. Vanilla Systems are most easily deployed baselines for any vision task. These systems are used when the classifier in use has been exposed to images that have more or less been exposed to similar distorted images during training time. Template-based system is considered as a baseline in the present disclosure because it represents current way of dealing with perception modules in robot systems, that may work well for many problems in which there is little to no deviation from the training setup. It is hypothesized that the system of the present disclosure selectively considers only the algorithms that allow entire system to achieve higher classification accuracy. Intuitively, for each image, the system of the present disclosure attempts to find a best algorithm or no algorithm (when the image is not distorted) from the set of algorithms that would fit in the pipeline to restore the image and classify its type. The method and system of the present disclosure, template-based system (conventional) and vanilla system (conventional) are evaluated in three task settings, which are referred as Known, Partially Known and Unknown test beds.

Known: In this setting, the TSM, during test time, comprises of only algorithms that were used during training.

Partially Known: In this setting, the TSM, during test time, comprises of a mixture of both algorithms that were used during training and the ones that were not.

Unknown: In this setting, the TSM, during test time, comprises of only algorithms that were not used during training.

Figure 7A:
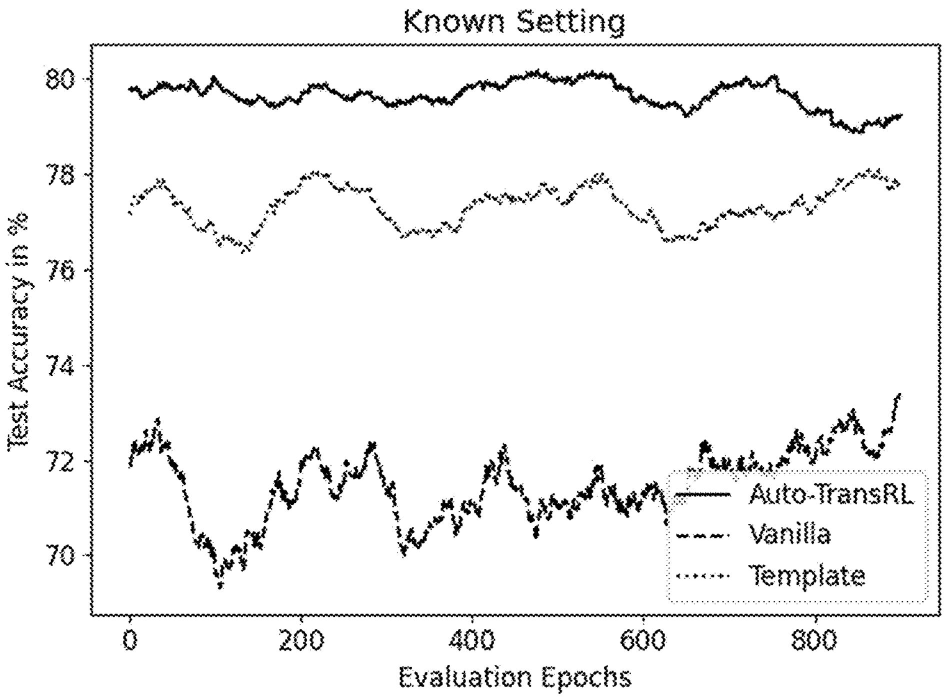
Figure 7B:
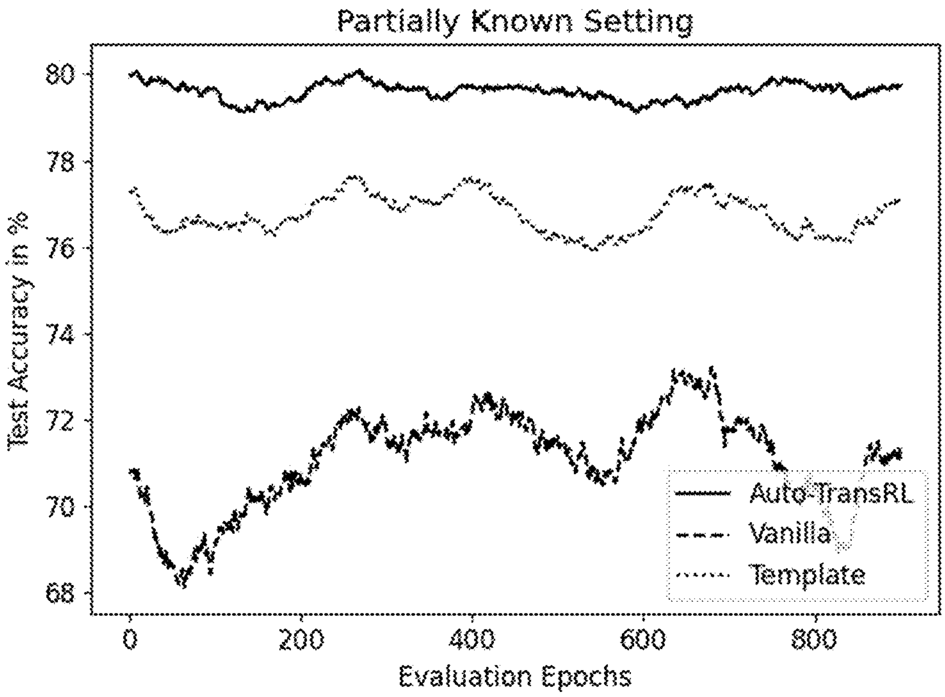
Figure 7C:
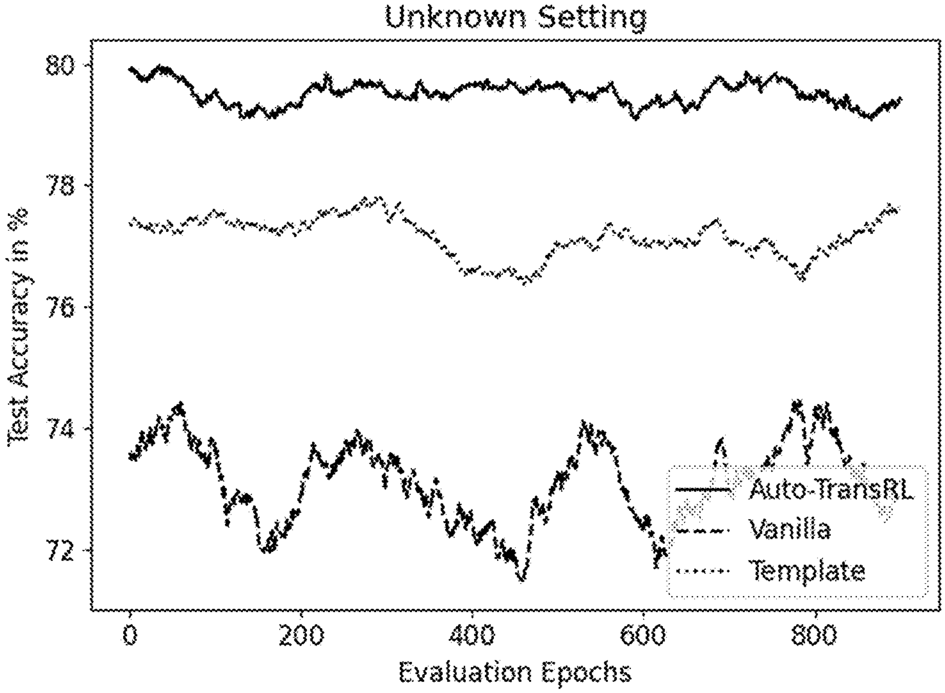

FIGS. 7A through 7C provides a comparison of conventional systems with the system of the present disclosure in terms of classification accuracy for a classification task on different distorted images according to some embodiments of the present disclosure. As shown in FIGS. 7A through 7C, the system of the present disclosure is compared with a template-based system, and a vanilla system in all the three tasks. It is observed from FIGS. 7A through 7C that the vanilla system fails to make significant progress towards solving the tasks and the system of the present disclosure outperforms the template based system, achieving a higher classification accuracy consistently.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:

receiving, via one or more hardware processors, (i) a plurality of input data pertaining to one or more domains of one or more enterprises, wherein the plurality of input data comprises an input image and (ii) a descriptive query from a user as input, wherein the plurality of input data comprises one or more input parameters, one or more domain requirements and corresponding solutions, and wherein the descriptive query describes a goal task to be executed on the plurality of input data, wherein the one or more domains comprising analytics, retail, or healthcare, and wherein the one or more domain requirements include problem statements related to one or more domains and solution selection in satellite analytics domain;

identifying, via the one or more hardware processors, a vision pipeline for execution of the goal task by inputting the descriptive query and one or more state attribute levels corresponding to the plurality of input data to a symbolic planner, wherein the symbolic planner dynamically composes one or more subtasks associated with the goal task and constructs a Directed Acyclic Graph (DAG) for each of the one or more subtasks using a parser, wherein the one or more state level attribute levels are determined using one or more state attribute identifier (SAI) based artificial neural networks, wherein the state attribute identifiers complement search algorithm to restrict a search over a set of algorithms that would be suited to address distortion undergone by the input image;

identifying, via the one or more hardware processors, a set of algorithms from a plurality of algorithms that are suitable to be executed at one or more stages of the vision pipeline for execution of the goal task using a transformers and Reinforcement Learning (RL) based autonomous pipeline composition framework, wherein the transformers and Reinforcement Learning based autonomous pipeline composition framework comprises a set of RL policies that are interlinked and resemble every step in the vision pipeline, and wherein each RL policy comprises:

(i) a task specific module comprising the plurality of algorithms that performs a specific sub task from the one or more subtasks associated with the goal task;

(ii) an embedding module comprising one or more neural networks corresponding to each algorithm in the plurality of algorithms comprised in the task specific module, wherein each fully connected neural network of the embedded module is configured to map output of each algorithm in the subset of algorithms to a specific embedding output dimensionality; and (iii) a transformer module comprising a key network and a query network, wherein the key network converts an embedding output of each of the set of algorithms into a key vector and the query network receives an aggregation output of the embedding output of each of the subset of algorithms to generate a global query vector; and dynamically configuring, via the one or more hardware processors, the vision pipeline for execution of one or more goal tasks in one or more environment and system configurations.

2. The processor implemented method of claim 1, wherein the transformer module comprised in each RL policy computes a dot product of each key vector corresponding to each algorithm in the plurality of algorithms comprised in the task specific module and the global query vector to obtain a weighted score.

3. The processor implemented method of claim 2, wherein the weighted score is used to identify an algorithm from the subset of algorithms to perform the specific subtask from the one or more subtasks associated with the goal task.

4. The processor implemented method of claim 1, wherein the symbolic planner dynamically composes the one or more subtasks associated with the goal task based on one or more user specified functionalities and corresponding metadata.

5. A system, comprising:

a memory storing instructions;

one or more communication interfaces; and one or more hardware processors coupled to the memory via the one or more communication interfaces, wherein the one or more hardware processors are configured by the instructions to:

receive, (i) a plurality of input data pertaining to one or more domains of one or more enterprises, wherein the plurality of input data comprises an input image and (ii) a descriptive query from a user as input, wherein the plurality of input data comprises one or more input parameters, one or more domain requirements and corresponding solutions, and wherein the descriptive query describes a goal task to be executed on the plurality of input data, wherein the one or more domains comprising analytics, retail, healthcare, and wherein the one or more domain requirements include problem statements related to one or more domains and solution selection in satellite analytics domain;

identify, a vision pipeline for execution of the goal task by inputting the descriptive query and one or more state attribute levels corresponding to the plurality of input data to a symbolic planner, wherein the symbolic planner dynamically composes one or more subtasks associated with the goal task and constructs a Directed Acyclic Graph (DAG) for each of the one or more subtasks using a parser, wherein the one or more state level attribute levels are determined using one or more state attribute identifier (SAI) based artificial neural networks, wherein the state attribute identifiers complement search algorithm to restrict a search over a set of algorithms that would be suited to address distortion undergone by the input image;

identify, a set of algorithms from a plurality of algorithms that are suitable to be executed at one or more stages of the vision pipeline for execution of the goal task using a transformers and Reinforcement Learning (RL) based autonomous pipeline composition framework, wherein the transformers and Reinforcement Learning based autonomous pipeline composition framework comprises a set of RL policies that are interlinked and resemble every step in the vision pipeline, and wherein each RL policy comprises:

(i) a task specific module comprising the plurality of algorithms that performs a specific sub task from the one or more subtasks associated with the goal task;

(ii) an embedding module comprising one or more neural networks corresponding to each algorithm in the plurality of algorithms comprised in the task specific module, wherein each fully connected neural network of the embedded module is configured to map output of each algorithm in the subset of algorithms to specific embedding output dimensionality; and (iii) a transformer module comprising a key network and a query network, wherein the key network converts an embedding output of each of the set of algorithms into a key vector and the query network receives an aggregated output of the embedding output of each of the subset of algorithms to generate a global query vector; and dynamically configure, the vision pipeline for execution of one or more goal tasks in one or more environment and system configurations.

6. The system of claim 5, wherein the transformer module comprised in each RL policy computes a dot product of each key vector corresponding to each algorithm in the plurality of algorithms comprised in the task specific module and the global query vector to obtain a weighted score.

7. The system of claim 6, wherein the weighted score is used to identify an algorithm from the subset of algorithms to perform the specific subtask from the one or more subtasks associated with the goal task.

8. The system of claim 5, wherein the symbolic planner dynamically composes the one or more subtasks associated with the goal task based on one or more user specified functionalities and corresponding metadata.

9. One or more non-transitory machine-readable information storage mediums comprising one or more instructions which when executed by one or more hardware processors cause:

receiving, (i) a plurality of input data pertaining to one or more domains of one or more enterprises, wherein the plurality of input data comprises an input image and (ii) a descriptive query from a user as input, wherein the plurality of input data comprises one or more input parameters, one or more domain requirements and corresponding solutions, and wherein the descriptive query describes a goal task to be executed on the plurality of input data, wherein the one or more domains comprising analytics, retail, healthcare, and wherein the one or more domain requirements include problem statements related to one or more domains and solution selection in satellite analytics domain;

identifying, a vision pipeline for execution of the goal task by inputting the descriptive query and one or more state attribute levels corresponding to the plurality of input data to a symbolic planner, wherein the symbolic planner dynamically composes one or more subtasks associated with the goal task and constructs a Directed Acyclic Graph (DAG) for each of the one or more subtasks using a parser, wherein the one or more state level attribute levels are determined using one or more state attribute identifier (SAI) based artificial neural networks, wherein the state attribute identifiers complement search algorithm to restrict a search over a set of algorithms that would be suited to address distortion undergone by the input image;

identifying, a set of algorithms from a plurality of algorithms that are suitable to be executed at one or more stages of the vision pipeline for execution of the goal task using a transformers and Reinforcement Learning (RL) based autonomous pipeline composition framework, wherein the transformers and Reinforcement Learning based autonomous pipeline composition framework comprises a set of RL policies that are interlinked and resemble every step in the vision pipeline, and wherein each RL policy comprises:

(i) a task specific module comprising the plurality of algorithms that performs a specific sub task from the one or more subtasks associated with the goal task;

(ii) an embedding module comprising one or more neural networks corresponding to each algorithm in the plurality of algorithms comprised in the task specific module, wherein each fully connected neural network of the embedded module is configured to map output of each algorithm in the subset of algorithms to a specific embedding output dimensionality; and (iii) a transformer module comprising a key network and a query network, wherein the key network converts an embedding output of each of the set of algorithms into a key vector and the query network receives an aggregation output of the embedding output of each of the subset of algorithms to generate a global query vector; and dynamically configuring, the vision pipeline for execution of one or more goal tasks in one or more environment and system configurations.

10. The one or more non-transitory machine-readable information storage mediums of claim 9, wherein the transformer module comprised in each RL policy computes a dot product of each key vector corresponding to each algorithm in the plurality of algorithms comprised in the task specific module and the global query vector to obtain a weighted score.

11. The one or more non-transitory machine-readable information storage mediums of claim 10, wherein the weighted score is used to identify an algorithm from the subset of algorithms to perform the specific subtask from the one or more subtasks associated with the goal task.

12. The one or more non-transitory machine-readable information storage mediums of claim 9, wherein the symbolic planner dynamically composes the one or more subtasks associated with the goal task based on one or more user specified functionalities and corresponding metadata.

* * * * *